United States Patent
Roy et al.

(10) Patent No.: US 11,589,315 B2
(45) Date of Patent: Feb. 21, 2023

(54) DYNAMIC RESIZING OF A SATELLITE LINK OUTROUTE OR FORWARD CHANNEL

(71) Applicants: Satyajit Roy, Gaithersburg, MD (US); George Choquette, Potomac, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 116 days.

(21) Appl. No.: 16/692,249

(22) Filed: Nov. 22, 2019

(65) Prior Publication Data
US 2021/0160786 A1 May 27, 2021

(51) Int. Cl.
| | | |
|---|---|---|
| H04W 52/14 | (2009.01) | |
| H04W 52/36 | (2009.01) | |
| H04W 72/04 | (2023.01) | |
| H04W 72/10 | (2009.01) | |
| H04L 1/00 | (2006.01) | |
| H04B 7/185 | (2006.01) | |
| H04W 72/044 | (2023.01) | |

(52) U.S. Cl.
CPC ....... *H04W 52/146* (2013.01); *H04W 52/365* (2013.01); *H04W 72/0473* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 3,706,037 A * | 12/1972 | Lundgren, Jr. | .... | H04B 7/18534 342/356 |
| 6,704,546 B1 * | 3/2004 | Lucidarme | .......... | H04W 52/346 455/450 |
| 6,760,566 B1 * | 7/2004 | Wright | ............... | H04B 7/18543 370/318 |
| 8,542,136 B1 * | 9/2013 | Owsley | ............... | H03M 7/3059 341/60 |

(Continued)

FOREIGN PATENT DOCUMENTS

CN 110381596 A * 10/2019 ......... H04B 7/18513

OTHER PUBLICATIONS

International Search report for PCT Application No. PCT/US2020/060130.

*Primary Examiner* — Sai Aung
*Assistant Examiner* — Liem H. Nguyen
(74) *Attorney, Agent, or Firm* — Capitol City TechLaw; Jasbir Singh

(57) ABSTRACT

A satellite communication system and method for resizing an outroute carrier from a gateway to a terminal population including determining, at the gateway, an insufficiency based on an Uplink Power Control (ULPC) function in conjunction with an Adaptive Coding and Modulation (ACM) function failing to maintain the outroute carrier in operation; and downsizing, at the gateway based on the insufficiency, the outroute carrier by decreasing a symbol rate of the outroute carrier from the gateway while maintaining the aggregate carrier output power level to increase an outroute carrier margin, where the insufficiency is based on a fade. The outroute carrier may be upsized when the insufficiency expires or is reduced.

18 Claims, 2 Drawing Sheets

(56) References Cited

U.S. PATENT DOCUMENTS

| | | | |
|---|---|---|---|
| 2003/0040274 A1* | 2/2003 | Dai | H04B 7/18543 455/427 |
| 2003/0054816 A1* | 3/2003 | Krebs | H04B 7/18582 455/428 |
| 2003/0073435 A1* | 4/2003 | Thompson | H04B 7/18513 455/428 |
| 2008/0242339 A1* | 10/2008 | Anderson | H04B 7/18543 455/522 |
| 2010/0260259 A1* | 10/2010 | Kimmich | H04N 21/631 375/240.07 |
| 2011/0003543 A1* | 1/2011 | Laufer | H04B 7/18513 455/3.02 |
| 2011/0021137 A1* | 1/2011 | Laufer | H04B 7/18513 455/13.4 |
| 2011/0255464 A1* | 10/2011 | Roos | H04B 7/18513 455/12.1 |
| 2012/0102162 A1* | 4/2012 | Devireddy | H04L 41/0896 709/221 |
| 2012/0164940 A1* | 6/2012 | Manea | H04L 1/0009 455/7 |
| 2012/0189017 A1* | 7/2012 | Davis | H04B 1/74 370/400 |
| 2013/0109299 A1* | 5/2013 | Roos | H04B 7/18513 455/12.1 |
| 2013/0135996 A1* | 5/2013 | Torres | H04L 47/821 370/230 |
| 2013/0315137 A1* | 11/2013 | Bhaskar | H04B 7/2125 370/324 |
| 2016/0195618 A1* | 7/2016 | Baer | H04B 7/18513 342/357.62 |
| 2018/0152351 A1* | 5/2018 | Roy | H04L 41/0896 |
| 2018/0167133 A1* | 6/2018 | Choquette | H04L 1/0009 |
| 2019/0020524 A1* | 1/2019 | Finkelstein | H04L 27/2646 |
| 2022/0052756 A1* | 2/2022 | Choiniére | H04B 7/18539 |

* cited by examiner

DYNAMIC RESIZING OF A SATELLITE LINK OUTROUTE OR FORWARD CHANNEL

FIELD

Dynamically resizing an outroute symbol rate downward so that a gateway can use more power in less Mega Symbols per second (Msps) when the outroute degrades to increase an error margin to decrease the degradation, for example, increasing a weather margin to reduce a rain fade. The outroute symbol rate may be resized upwards as the fade diminishes. In some embodiments, an inroute may be resized downward in a similar proportion so that a satellite can use the same power for fewer channels. The present teachings may be used with higher radio frequency satellite links, for example, links operating in the Ka band, Q band, V band, or like.

BACKGROUND

There are several reasons behind the need for resizing outroute(s) or forward channel(s) dynamically in a satellite network. One of the main reasons is fade either at a gateway or a user beam. Higher frequency bands are not only more susceptible to fades, fades also typically last longer at the higher frequency bands. A gateway site or location unavailability can be addressed by various means, such as Radio Frequency (RF) diversity, gateway diversity/redundancy (1:n or n:k) etc. depending on the system, and network configuration. In some cases, the outroute fade cannot be mitigated by these means. For example, a diversity site may already be in use by another primary gateway in fade. In another example, the diversity site itself is down, for example, due to a power failure, maintenance or fade at the diversity site. In another example, the system needs an ultra-high availability and reliability (e.g. a DoD system). In yet another instance, the rain fade could be in the user beam downlink. Even when the fade is in the user beam, by scaling down the carrier size more downlink power can be obtained.

The present teachings provide connectivity for a terminal population via an outroute when a modulation and coding function and ULPC function are insufficient to maintain the outroute.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Dynamic outroute resizing can be executed in a satellite network in an efficient way and to minimize packet loss, TCP sessions loss etc.

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a non-transient computer-readable storage medium having instructions embodied thereon. The instructions for resizing an outroute carrier from a gateway to a terminal population include determining, at the gateway, an insufficiency based on an Uplink Power Control (ULPC) function in conjunction with an Adaptive Coding and Modulation (ACM) function failing to maintain the outroute carrier in operation; and downsizing, at the gateway based on the insufficiency, the outroute carrier by decreasing a symbol rate of the outroute carrier from the gateway while maintaining the aggregate carrier output power level to increase an outroute carrier margin, where the insufficiency is based on a fade. Other embodiments of this aspect include corresponding computer systems, apparatus, and computer programs recorded on one or more computer storage devices, each configured to perform the actions of the methods.

Implementations may include one or more of the following features. The method may include selecting, at the gateway, a diversity gateway not subject to the fade; and when the diversity gateway is available, switching to the diversity gateway instead of the downsizing, where the fade of the outroute carrier is between a satellite and the gateway. The method where the downsizing decreases a range of a frequency band of the outroute carrier in one or more steps while maintaining a center frequency of the frequency band. The method where the downsizing halves a range of a frequency band of the outroute carrier while maintaining a center frequency of the frequency band. The method may include upsizing the outroute carrier, at the gateway, the outroute carrier by increasing a range of a frequency band of the outroute carrier in one or more steps when the insufficiency expires or is reduced in scale. The outroute carrier provisioning may include multiple outroute carriers for a beam, and the determining and the downsizing are performed independently for the multiple outroute carriers. The multiple carriers maybe contiguous or non-contiguous. The method where the determining of the insufficiency is based on the ULPC function reaching a threshold power and the insufficiency expires based on the ULPC function dropping below the threshold power. The method where the determining of the insufficiency is based on an average Modulation and Coding (MODCOD) value of at least a minimum of the terminal population reaching a threshold MODCOD value and the insufficiency expires based on the average MODCOD reaching a differential threshold MODCOD value. The method where the determining of the insufficiency is based on anticipating an outage due to predicted weather at the gateway or a locus of the terminal population. The method may include transmitting a resize steps information, from the gateway to the terminal population, included in a system information or via an anchor outroute exempt from the downsizing. The method may include sending a resize steps information, from the gateway to the terminal population, via a neighboring beam adjacent to a beam that includes the outroute carrier, where the neighboring beam is transmitted from a second gateway other than the gateway. The method may include throttling, at the gateway, a streaming and bulk traffic to be conveyed by the downsized outroute carrier to improve conveyance of an interactive traffic by the outroute carrier, and subsequently decreasing the throttling when the outroute carrier size insufficiency expires or is reduced. The method may include proportionally adjusting minimum guaranteed bandwidths for each respective guaranteed bandwidth subscriber that has traffic to be conveyed by the downsized outroute carrier, and subsequently restoring the guaranteed bandwidth when the outroute carrier size insufficiency expires or is reduced. Implementations of the described techniques may include hardware, a method or process, or computer software on a computer-accessible medium.

One general aspect includes a satellite communication system to resize an outroute carrier from a gateway to a terminal population. The satellite communication system includes an uplink power control (ULPC) function in conjunction with an adaptive coding and modulation (ACM) function at the gateway failing to maintain the outroute carrier in operation based on an insufficiency; and a carrier size function, at the gateway based on the insufficiency, to downsize the outroute carrier by decreasing a symbol rate of the outroute carrier from the gateway to increase an outroute carrier margin, where the insufficiency is based on a fade. Other embodiments of this aspect include corresponding computer systems, apparatus, and computer programs recorded on one or more computer storage devices, each configured to perform the actions of the methods.

Implementations may include one or more of the following features. The system where the carrier size function halves a range of a frequency band of the outroute carrier while maintaining a center frequency of the frequency band. The system where the carrier size function upsizes the outroute carrier by increasing a range of a frequency band of the outroute carrier while maintaining a center frequency of the frequency band, when the insufficiency has expired. The outroute carrier provisioning may include multiple outroute carriers for a beam, and the carrier size function independently downsizes the multiple outroute carriers. The system where the insufficiency is based on the ULPC function reaching a maximum or threshold power and/or an average modulation and coding (MODCOD) scheme of a sufficient terminal population reaching a threshold MODCOD value. The system where the insufficiency is based on anticipating an outage due to predicted weather at the gateway or a locus of the terminal population. The system may include a flow control manager to throttle, at the gateway, a streaming and bulk traffic to be conveyed by the reduced size outroute carrier to improve conveyance of an interactive traffic to be conveyed by the outroute carrier, and to subsequently remove or decrease throttling when the outroute carrier size is restored or increased. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
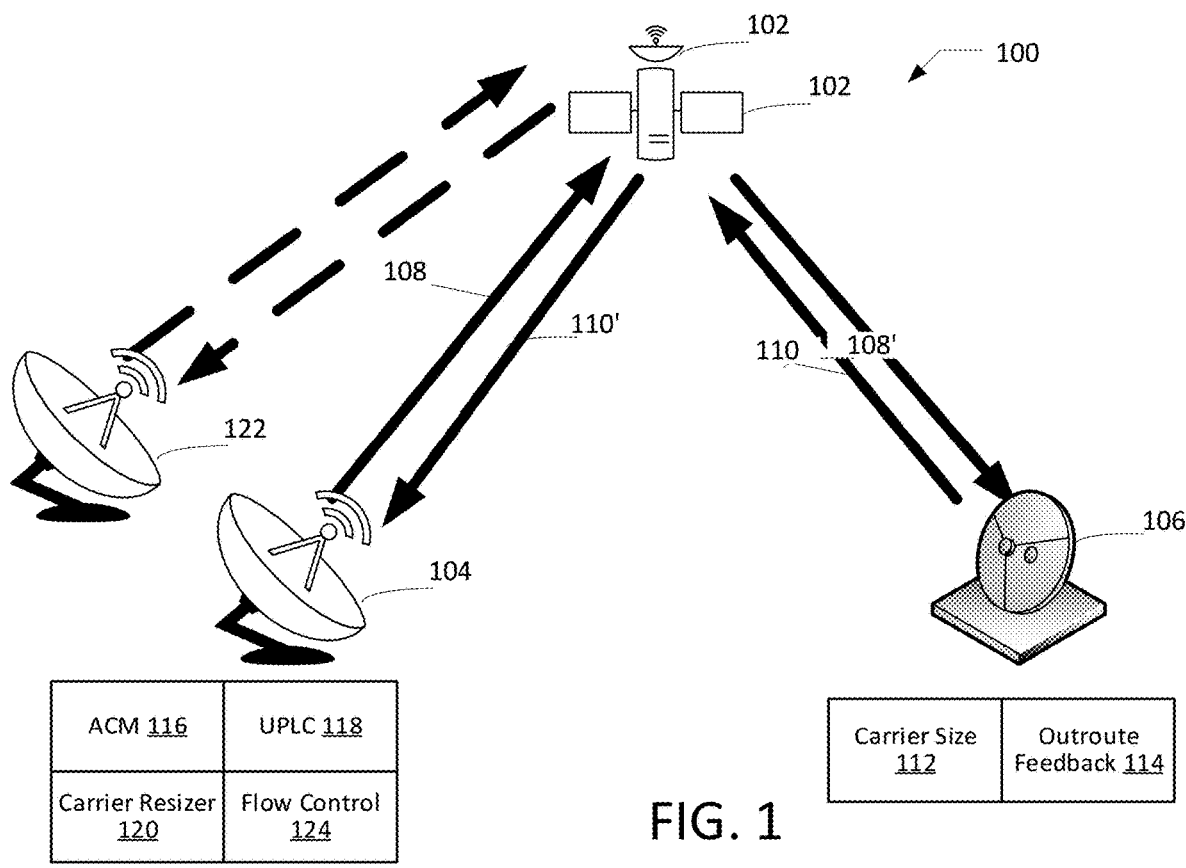
FIG. 1 illustrates an exemplary satellite communication system that resizes an outroute carrier from a satellite gateway to a terminal population according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to optimizing link availability for a satellite communications network by automatically resizing a forward channel carrier bandwidth to compensate for onset or subsidence of rain fade on a Gateway beam uplink or a user beam downlink.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

An outroute resizing process may include determining that a reconfiguration of outroutes should occur. The outroute resizing process may start from a trigger that is external to the outroute resizing process. Reconfiguration of outroutes may take various forms, such as an outroute's frequency band (and symbol rate) is sized down to a smaller frequency band (and symbol rate), or an outroute's frequency band (and symbol rate) is sized up to a bigger frequency band (and symbol rate). In some embodiments, a center frequency of the frequency bands remains unchanged.

In other embodiments, a center frequency of the frequency bands changes in one or more steps that have previously been indicated to terminals such that they can find the resized outroute carrier.

FIG. 1 illustrates an exemplary satellite communication system that resizes an outroute carrier from a satellite gateway to a terminal population according to various embodiments.

An outroute resize system 100 may include a satellite 102, a gateway 104 and a terminal population 106. Communication from the gateway 104 to the terminal population 106 is via an outroute that includes an uplink 108 from the gateway 104 that is relayed by the satellite 102 as a downlink 108' to the terminal population 106. Communication from the terminal population 106 to the gateway 104 is via an inroute that includes an uplink 110 from the terminal population 106 relayed by the satellite 102 as a downlink 110' to the gateway 104. The gateway 104 may include an ACM function 116, an ULPC function 118 and a carrier size function 120. Terminals in the terminal population may include a carrier size function 112 and an outroute feedback subsystem 114. In some embodiments, each terminal in the terminal population 106 includes an instantiation of the carrier size function 112 and the outroute feedback subsystem 114.

The carrier size function 112 may maintain a carrier size information to provide to a receiver (not shown) in the terminal. The carrier size information may be static, may be preconfigured via configuration download from a management system, or maybe conveyed from the carrier size function 120 of the gateway 104 as discussed below. The carrier size function 112 provides the receiver with the frequency bands and how they may be resized for the outroute carrier in use. The outroute feedback subsystem 114 may measure and communicate various characteristics (such as Signal to Noise ratio or selected target ACM MODCOD) for the outroute carrier as received at a terminal of the terminal population 106 to the gateway 104. The various characteristics from the outroute feedback subsystem 114 may be used by the ACM function 116, the ULPC function 118 and the carrier size function 120 at the gateway 104. The outroute resize system 100 may include a diversity gateway 122. The outroute resize system 100 may include a flow control subsystem 124 to throttle the outroute carrier when the outroute carrier is downsized or upsized. The flow control subsystem 124 may maintain minimum guaranteed bandwidth proportionality when the outroute carrier is downsized or upsized.

Figure 2:
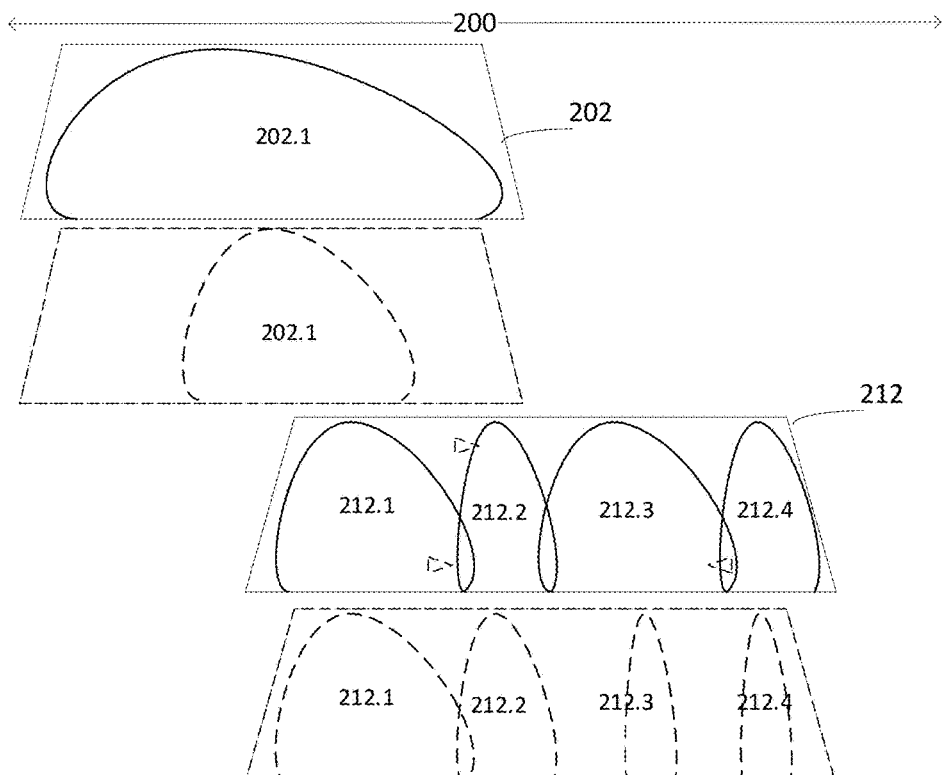
FIG. 2 illustrates a beam, carriers and carrier frequency bands, according to various embodiments.

FIG. 2 illustrates a beam, carriers and carrier frequency bands, according to various embodiments.

A first frequency range 202 and a second frequency range 212 may be assigned carrier frequency bands to a beam 200. The first frequency range 202 might for example be assigned one carrier frequency band 202.1. The second frequency range might for example be assigned multiple carrier frequency bands, 212.1, 212.2, 212.3 and 212.4. The first and second frequency ranges might be of the same or of different sizes, and the constituent carrier frequency bands may have the same or different transmit symbol rates.

In FIG. 2, the first frequency range 202 contains carrier frequency band 202.1. After a resize, the new carrier plan for the first frequency range 202 is illustrated in a dashed line, and the frequency band 202.1 has been halved. If in this example the aggregate power for the first frequency range 202 is maintained through the resizing, the rain margin of carrier frequency band 202.1 will be improved by 3 dB.

In FIG. 2, the second frequency range 212 spans carrier frequency bands 212.1, 212.2, 212.3 and 212.4. These bands may be contiguous or non-contiguous, and of the same or different sizes. After a resize, the carrier plan for the second frequency range 212 is illustrated in a dashed line, and the frequency band 212.3 has been halved twice, and frequency band 212.4 has been halved. This action would change range margin for all carriers in the second frequency range 212, assuming all are carried through the same amplification path, by an amount depending on the change in aggregate symbol rate for 212.1, 212.2, 212.3 and 212.4.

Dynamic Outroute Reconfiguration Due to Outroute Degradation

When link condition starts degrading, an Uplink Power Control (ULPC) function and Adaptive Coding and Modulation (ACM) function for the outroute kicks in to maintain the link in operation. When these schemes fail to maintain the link and an RF diversity site is not available as a mitigation, the capability to dynamically reconfigure the outroute carrier (downsize in this case) may be used. The reconfiguration downsizes by decreasing the symbol rate of a carrier. Downsizing of outroute carriers is not without cost as it cuts down the available link capacity. Also, terminals need to relock or camp on the resized outroute resulting in some sort of outages unless terminals go down anyway.

For example, a 3-dB extra margin may be obtained when an outroute carrier is cut in half while maintaining the same aggregate output power level for that carrier. The downsizing of the outroute carrier obtains more power on the gateway uplink as transmitted by the gateway and/or the user beam downlink as transmitted by the satellite. Obtaining more power here does not refer to increasing a signal power of the transmitter, rather it refers to applying the same signal power to a narrower frequency band of the outroute carrier. Analogously, for example, a 3-dB margin may be lost by doubling a frequency band of the outroute carrier.

A multi-band Gateway may have a mixture of V-band, Q-band, and Ka-band uplinks. As higher frequencies bands are more susceptible to rain fade, the V and Q-band uplinks may fade faster than the Ka-band uplink. In one example, a carrier size function may decide to downsize a subset of the uplinks when the ULPC and ACM functions cannot maintain the link, for example, only V and Q-band outroutes may be downsized and the Ka-band outroutes remain unchanged.

A user beam with downlink fade may include outroute or forward link carriers from different frequency bands (for example, V, Q or Ka) and the carriers in the beam can be resized independent of each other as necessary. In some embodiments, the carrier size function determines when and how to resize each outroute within a beam independently.

The carrier size function may determine outroute resizing based on any or all of an average MODCOD of terminals on that outroute, weather data if available, and an Uplink Power control feedback reaching a maximum or threshold transmit power level. The system may track the average MODCOD of terminals on a per outroute basis. For example, if the average MODCOD of terminals drops down from 16 APSK ½ to a very robust but inefficient MODCOD (for example, QPSK ½ plus), then the carrier size function may cut the outroute size in half or by some other step to assist a lost terminal (a terminal that cannot close a link with the gateway possibly at the beam edge) to get a signal, particularly if the ACM function for that terminal is already at the minimum MODCOD allowed. This determination might be made in event some minimum number of terminals are contributing values to the MODCOD average, and/or after maintenance of that average for some time duration, to avoid unneeded resizing in system startup conditions or other unusual scenarios. In some embodiments, a gateway may assume that there are lost terminals that can no longer close the link when the ACM function is at the MODCOD minimum for some period. In some embodiments, it might be beneficial to perform the outroute carrier(s) downsizing in an anticipation of an extended outage. Anticipating of an extended outage, may be based on analysis of weather radar information, machine learning based weather prediction or using feedback information from the Uplink Power Control (ULPC) function and/or ACM function.

The carrier size function may determine to increase a reduced size outroute back to its original size in a single or in multiple steps based on further feedback from the ULPC function and/or ACM function, as a rain fade subsides. The ULPC function may indicate a transmit power level that reflects power head room at or above a threshold configured to trigger upsizing. The ACM function may indicate an average MODCOD at or above a threshold configured to trigger upsizing. As with downsizing, upsizing may be based on samples from at least a given number of terminals, and/or maintained for a given time duration. This upsizing may be in a single step or in multiple steps, analogous to the downsizing of the outroute carrier. In some embodiments, when downsizing due to an anticipated outage by analysis of weather radar information, the upsizing might be triggered by weather radar data indicating the rain fade is reduced or might be triggered by some other means such as the ACM function.

Conveying the Resizing of Outroute Carrier

One of the challenges in dynamic resizing of outroute carrier(s) is how to convey the new outroute(s) information to the satellite terminals, including to terminals which are powered off or not online at the time of resizing of the outroute carrier(s). Moreover, some terminals may already have dropped off due to fade as a connection could not be maintained using ACM function even at the MODCOD minimum. This discussion of conveying of the resizing of outroute carrier is applicable to outroute resizing regardless of the reason behind the resizing.

In some embodiments, a pre-known static resize steps information for dynamic outroute carrier resizing can be defined, and the resize steps information may be pre-downloaded to each terminal. Each terminal, upon losing the current outroute and not having an alternate outroute configured or available, may lock on to an outroute as defined by the resize steps information in a defined order. As the terminal is not completely blind about the potential new outroutes after the dynamic resizing occurs, a terminal may find the actual outroute quickly. With this arrangement, a terminal may find and quickly lock to the resized carriers. A terminal population may include operational terminals being faded and terminals that have faded. Additionally, the terminal population may include just turned on terminals and newly installed terminals. The pre-determined resize steps information may be used for both the downward and upward sizing scenarios. Both faded and offline terminals may use the predefined resize steps information. For example, assume the original outroute size is 100 Msps and the pre-defined steps are 100, 50, 20 and 80 Msps. The terminal population seeking to close a satellite link may start from 100 Msps, and then cycle through 50, 20, 80 and again 100 Msps and so on until link closure.

Resizing and Sizing Announcement using Anchor Outroute

In some embodiments, an anchor outroute may be defined and installed in each beam. The anchor outroute may be used to announce the resize steps information, any upcoming outroutes size changes, and after the resizing, to broadcast the information of new resized outroutes. In some embodiments, the anchor outroutes are very small and at a power and frequency range so as to be more likely to remain operational during the fade. The anchor outroute control information broadcast MODCOD and carrier may be very robust and more resilient from fade than are used for user traffic carriers. After a terminal loses the current outroute for a predefined duration, the terminal may lock to the anchor to receive the resized outroutes information and parameters. Thereafter, the terminal may lock to a new outroute to close a link and obtain service.

When a terminal is equipped with more than one receiver, it might use more than one of the receivers to search for an outroute in case of outroute resizing, reducing service down time. In some embodiments, the terminal may lock to the anchor outroute while it is still connected to the network using its current traffic carrier. Additionally, a synchronized switching from the current outroute to the resized outroute may be achieved by using the outroute frame number. The resized outroute information may include an outroute frame number to inform the terminal of when it should use the new outroute, before break where possible.

Resizing with System Information

When a reconfiguration is about to happen, the gateway may start sending out system information on the carrier about to be resized, describing the new outroute carrier(s) to alert the active terminals. Through the system information, prospective sizing or step sizes may also be announced. This dynamic scheme has a problem in that some terminals may already have been faded from the network before the system information broadcasts the new outroute carrier(s) via the current outroute, and such terminals need to find the new resized outroute. This case can be addressed by predefining few step sizes and preloading such information to all terminals and using system information to trigger rapid reacquisition of the resized outroute by terminals as are not yet faded.

Mobile Terminals

With respect to mobility, the resized outroutes information may be broadcast and announced through the neighboring beams as well. This may not be possible if neighboring beams are from the same gateway, as both gateways may be subject to the same fade. This will allow the mobile terminal to obtain the resized outroutes information of the upcoming beam to which it is going to be handed over and so the mobile terminal already has the new resized carriers' information before moving to the target beam. In a mixture of mobile and stationary system (with respect to the terminals), the system may keep certain mobile terminal outroute carriers unchanged (whilst stationary terminals carriers are downward resized) if the mobile terminal can still close the link. This would be the case when user beam downlink impairment occurs for the stationary terminals but not for the mobile terminals because the mobile terminals might be flying, for example, above the rain and cloud. This would not be the case for a gateway uplink fade, which would equally affect fixed and mobile terminals.

Traffic flow control and virtual network operators

Downward resizing of outroutes reduces the available capacity, and so dynamic adjustment of the outroute flow control parameters to more aggressively throttle the streaming and bulk traffic may be helpful for the efficient treatment of the network interactive traffic. Such throttling parameter values, for example, weights that govern traffic admittance priorities for different traffic classes of service, could be configured to be coupled with the various resizing steps. For example, a traffic admittance weighting of 5% conversational, 25% interactive, 40% streaming and 30% bulk during normal operation, might be adjusted to 10% conversational, 50% interactive, 30% streaming and 10% bulk during a first resize down step, and might be adjusted to 15% conversational, 60% interactive, 20% streaming and 5% bulk during a second resize down step. Or alternatively, weights might be derived algorithmically, for example as sufficient in order to maintain a given target maximum forward queuing latency for interactive traffic. As the rain fade subsequently reduces, the traffic weighting might be returned in steps to the original configured values.

The system may support virtual network operators (VNOs) or other subscribers subscribing to minimum guaranteed bandwidth in megabits per second (Mbps) on the outroutes or beams. The minimum guaranteed bandwidth should always be available in the system in a clear sky condition but might not be maintained in case of rain fade. With the downward resizing of outroute carriers, dynamic adjustment of the minimum guaranteed bandwidth for each of the subscribers may be performed by the system proportionally. Otherwise, some subscribers may get their original minimum subscription and some subscribers could be starved completely Similarly, dynamic downgrading of terminal service rate might be required for terminals with committed information rates (CIRs), and such downgrade may be performed proportionally. Upon alleviation of the fade condition, VNO bandwidth and terminal service rates would be restored.

Using MODCOD Below the MODCOD Minimum

A system may combine automatic dynamic outroute resizing with automatic dynamic extension of the ACM function operating range to facilitate announcement of outroute resizing, and/or to improve availability in fades. The system might enable use of a very robust but inefficient ACM MODCOD, for example QPSK rate ¼ FEC, only when a certain operating threshold is reached, and only while that operating condition is maintained.

Typically, or in normal condition, the outroute code rate QPSK ¼ might not be used for the control traffic, as it would consume capacity inefficiently for control traffic, and be needed only by some terminals which may have badly aimed antennas. However, a QPSK ¼ rate would provide better margin to announce an outroute resizing downward in case of rain fade, providing faster service recovery by terminals. In such a case, the system could use QPSK ½ for control traffic during normal conditions, but automatically switch to QPSK ¼ in case of fade as indicated by ULPC or the ACM average MODCOD. This could be done in advance of outroute resizing downward, such that more terminals will receive notice of the resizing and not have to search for the resized outroute. After the resizing downward, or in event the fade subsides, control traffic would be switched back to QPSK In some embodiments, in order to maintain service availability for at least some of the terminal population, the system might enable use of QPSK ¼ (or some other highly robust format) for terminal data traffic if a fade continues to deepen after the maximal outroute downsizing step, so as to maintain service availability for at least some of the terminal population. In such case, control and user data traffic would also be sent using MODCOD QPSK ¼. As the fade alleviates, as indicated by ULPC head room or average ACM MODCOD, the system might automatically disable use of QPSK ¼ for traffic and/or control at some threshold value lower than the threshold to resize the outroute size upward.

Diversity Gateway

When a system supports a diversity gateway, service might be switched from a faded primary gateway to a diversity gateway or to a diversity RF terminal site for a gateway, rather than resizing the primary gateway outroute carriers down in size. However, a primary gateway fade may not result in a diverse gateway or RF terminal taking over—the diverse site might be down due to fault, or the diverse site might also be faded, or the diverse site might have been used to take over for another primary site. In such case, dynamic outroute resizing would be triggered. If the diverse site subsequently becomes available, the faded primary site can be switched to the diverse site and the outroute carriers restored to their original symbol rates to recover system forward capacity.

In some embodiment, a differentiated usage of a diverse gateway may be provided for the outroute resizing event. When multiple primary gateways experience fade simultaneously and one diverse gateway is available at that time, the selection of the primary gateway to be switched to the diverse gateway may be determined based on which of the primary gateway's fade cannot be completely or partially mitigated by performing outroute resizing. This might be evaluated by comparing ULPC head room or average ACM MODCOD. Also, preemption of a primary gateway being currently taken over by a diverse gateway might be supported. For example, it may be possible that second primary gateway is in fade and cannot be mitigated by the dynamic outroute resizing whereas outroute resizing mitigation is possible for a first primary gateway that has already been switched to the diverse gateway. In this case, the first primary gateway may be removed from the diverse gateway and the second faded primary gateway may be assigned to the diverse gateway. This determination might be made from feedback from the respective primary gateway ULPC subsystems, recognizing that the first primary gateway ULPC has regained enough power head room to enable availability by using reduced outroute sizes. The outroutes are resized from the first primary gateway.

Figure 3:
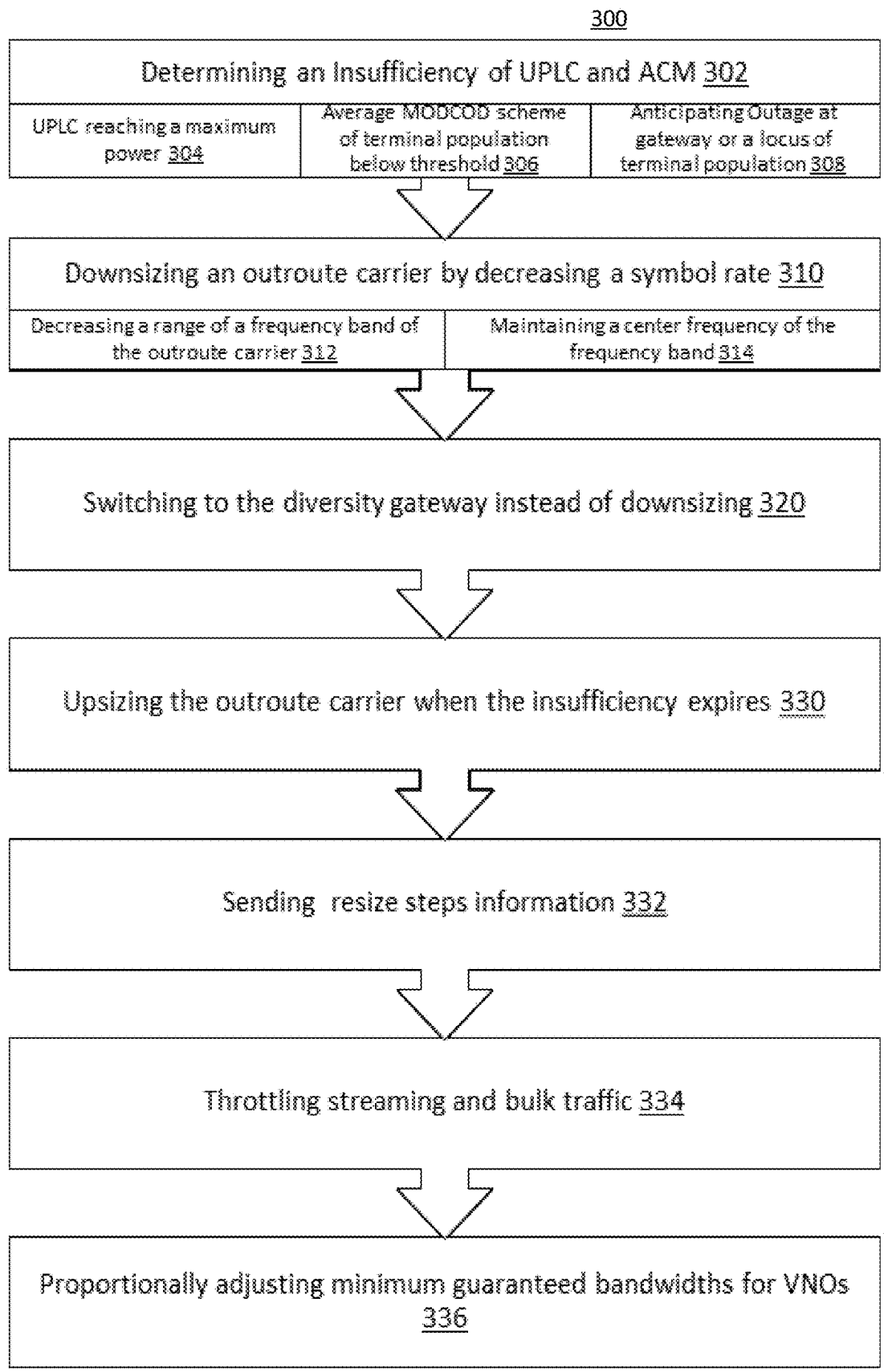
FIG. 3 illustrates a method for resizing an outroute carrier from a gateway to a terminal population, according to various embodiments.

FIG. 3 illustrates a method for resizing an outroute carrier from a gateway to a terminal population, according to various embodiments.

A 300 method for resizing an outroute carrier from a gateway to a terminal population may include operation 302 for determining an insufficiency of ULPC function and ACM function to maintain an outroute carrier in operation. The method 300 may include operation 304 for determining insufficiency when the ULPC function reaches a threshold or maximum power. The method 300 may include operation 306 for determining insufficiency when an average MODCOD scheme of terminal population falls below a threshold. The method 300 may include operation 308 for determining insufficiency when anticipating an outage at gateway or a locus of terminal population.

The method 300 may include operation 310 for downsizing an outroute carrier by decreasing a symbol rate. The method 300 may include operation 312 for decreasing a range of a frequency band of the outroute carrier. The method 300 may include operation 314 for maintaining a center frequency of the frequency band. The method 300 may include operation 320 for switching to the diversity gateway not subject to the fade instead of downsizing when a diversity gateway is available. The method 300 may include operation 330 for upsizing the outroute carrier when the insufficiency expires. The method 300 may include operation 332 for sending resize steps information. The method 300 may include operation 334 for throttling streaming and bulk traffic using the downsized outroute carrier. The method 300 may include operation 336 for proportionally adjusting minimum guaranteed bandwidths for VNOs using the downsized outroute carrier.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim:

1. A non-transient computer-readable storage medium having instructions embodied thereon, the instructions being executable by one or more processors to perform a method for resizing an outroute carrier from a gateway to a terminal population, the method comprising:
   failing to maintain the outroute carrier in operation for the terminal population with an Uplink Power Control (ULPC) function in conjunction with an adaptive coding and modulation (ACM) function;
   determining, at the gateway, that the failing was based on an insufficiency of the ULPC function in conjunction with the ACM function in conjunction with a fade;
   downsizing, at the gateway based on the insufficiency, the outroute carrier by decreasing a symbol rate of the outroute carrier from the gateway for the terminal population while maintaining an aggregate carrier output power level to increase an outroute carrier margin by using more power for each symbol transmitted at the decreased symbol rate; and
   upsizing, at the gateway, the outroute carrier by increasing a range of a frequency band of the outroute carrier in one or more steps while maintaining a center frequency of the frequency band, when the insufficiency expires or is reduced in scale,
   wherein the determining further comprises determining that the insufficiency has expired and wherein the resizing changes the symbol rate of the outroute carrier.

2. The method of claim 1, further comprising selecting, at the gateway, a diversity gateway not subject to the fade; and when the diversity gateway is available, switching to the diversity gateway instead of the downsizing, wherein the fade of the outroute carrier is between a satellite and the gateway.

3. The method of claim 1, wherein the downsizing decreases the range of the frequency band of the outroute carrier in one or more steps while maintaining the center frequency of the frequency band.

4. The method of claim 1, wherein the downsizing halves the range of the frequency band of the outroute carrier while maintaining the center frequency of the frequency band.

5. The method of claim 1, wherein a provisioning of the outroute carrier comprises multiple outroute carriers for a beam, and the determining and the downsizing are performed independently for each of the multiple outroute carriers.

6. The method of claim 1, wherein the determining of the insufficiency is based on the ULPC function reaching a threshold power and the insufficiency expires or is reduced based on the ULPC function dropping below the threshold power.

7. The method of claim 1, wherein the determining of the insufficiency is based on an average Modulation and Coding (MODCOD) value of at least a minimum of the terminal population reaching a threshold MODCOD value, and the insufficiency expires or is reduced based on the average MODCOD reaching a differential threshold MODCOD value.

8. The method of claim 1, wherein the determining of the insufficiency is based on anticipating an outage due to predicted weather at a locus of the terminal population.

9. The method of claim 1, further comprising transmitting a resize steps information, from the gateway to the terminal population, included in a system information or via an anchor outroute exempt from the downsizing.

10. The method of claim 1, further comprising transmitting a resize steps information, from the gateway to the terminal population, via a neighboring beam adjacent to a beam comprising the outroute carrier, where the neighboring beam is transmitted from a second gateway other than the gateway.

11. The method of claim 1, further comprising throttling, at the gateway, a streaming and bulk traffic to be conveyed by the outroute carrier to improve conveyance of an interactive traffic to be conveyed by the outroute carrier, and subsequently decreasing the throttling when the insufficiency expires or is reduced.

12. The method of claim 1, further comprising proportionally adjusting minimum guaranteed bandwidths for each guaranteed bandwidth in megabits per second (Mbps) that has traffic to be conveyed by the outroute carrier, and subsequently restoring the guaranteed bandwidths when the insufficiency expires or is reduced.

13. The method of claim 1, further comprising enabling a very robust MODCOD value for the outroute carrier prior to the downsizing; and disabling the very robust MODCOD value for the outroute carrier after the downsizing.

14. The method of claim 1, further comprising enabling a very robust MODCOD value for the outroute carrier, when the downsizing of the outroute carrier has reached a threshold resize step information.

15. A satellite communication system to resize an outroute carrier from a gateway to a terminal population, the satellite communication system comprising:
   an Uplink Power Control (ULPC) function in conjunction with an adaptive coding and modulation (ACM) function, at the gateway, to maintain the outroute carrier in operation for the terminal population and to determine a failing of the outroute based on an insufficiency of the ULPC function in conjunction with the ACM function in conjunction with a fade; and
   a carrier size function, at the gateway based on the insufficiency, to downsize the outroute carrier for the terminal population by decreasing a symbol rate of the outroute carrier from the gateway while maintaining an aggregate carrier output power level to increase an outroute carrier margin by using more power for each symbol transmitted at the decreased symbol rate,
   wherein the resize changes the symbol rate of the outroute carrier, and
   the carrier size function upsizes the outroute carrier by increasing a range of a frequency band of the outroute carrier while maintaining a center frequency of the frequency band, when the insufficiency has expired or is reduced.

16. The satellite communication system of claim 15, wherein the carrier size function halves the range of the frequency band of the outroute carrier while maintaining the center frequency of the frequency band.

17. The satellite communication system of claim 15, wherein a provisioning of the outroute carrier comprises multiple outroute carriers for a beam, and the carrier size function determines a respective insufficiency for each of the multiple outroute carriers and independently downsizes the multiple outroute carriers based on the respective insufficiency.

18. The satellite communication system of claim 15, wherein the insufficiency is based on both the ULPC function reaching a threshold power and an average Modulation and Coding (MODCOD) value of at least a minimum of the terminal population reaching a threshold MODCOD value.

* * * * *